(12) United States Patent
Inada

(10) Patent No.: US 9,781,034 B2
(45) Date of Patent: Oct. 3, 2017

(54) ELECTRONIC DEVICE, NETWORK RELAY DEVICE, AND NON-TRANSITORY COMPUTER READABLE STORAGE MEDIUM

(71) Applicant: BUFFALO INC., Nagoya-shi (JP)

(72) Inventor: Tetsuya Inada, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 332 days.

(21) Appl. No.: 14/598,054

(22) Filed: Jan. 15, 2015

(65) Prior Publication Data

US 2015/0222542 A1 Aug. 6, 2015

(30) Foreign Application Priority Data

Jan. 31, 2014 (JP) ................................. 2014-016797
Nov. 12, 2014 (JP) ................................. 2014-229729

(51) Int. Cl.
  *H04L 12/749* (2013.01)
  *H04L 12/781* (2013.01)
  *H04L 29/06* (2006.01)

(52) U.S. Cl.
  CPC .......... *H04L 45/741* (2013.01); *H04L 45/52* (2013.01); *H04L 69/167* (2013.01)

(58) Field of Classification Search
  None
  See application file for complete search history.

(56) References Cited

U.S. PATENT DOCUMENTS

| 6,580,717 | B1 | 6/2003 | Higuchi |
| 6,870,852 | B1* | 3/2005 | Lawitzke ............... H04L 45/04 370/351 |
| 7,188,191 | B1 | 3/2007 | Hovell |
| 9,379,959 | B1 | 6/2016 | Torvi et al. |
| 2001/0040895 | A1 | 11/2001 | Templin |
| 2002/0021697 | A1 | 2/2002 | Tsuchiya |
| 2002/0021703 | A1 | 2/2002 | Tsuchiya |
| 2002/0031130 | A1 | 3/2002 | Tsuchiya |
| 2002/0150103 | A1 | 10/2002 | Hamamoto |

(Continued)

FOREIGN PATENT DOCUMENTS

| JP | 2008-252840 A | 10/2008 |
| JP | 2008-294983 A | 12/2008 |

(Continued)

OTHER PUBLICATIONS

Office Action issued Dec. 22, 2015 in Japanese Patent Application No. 2014-229729 (submitting English translation only).

(Continued)

*Primary Examiner* — Michael Thier
*Assistant Examiner* — Zhensheng Zhang
(74) *Attorney, Agent, or Firm* — Oblon, McClelland, Maier & Neustadt, L.L.P.

(57) ABSTRACT

An electronic device that relays an Internet Protocol (IP) packet compliant with one of a plurality of IP versions includes circuitry configured to process the IP packet in each of a first mode operating as a router and a second mode operating as a bridge; and set, as a mode of the electronic device, one of the first mode or the second mode, based on which of the plurality of IP versions the IP packet to be processed is compliant with.

17 Claims, 11 Drawing Sheets

(56) References Cited

U.S. PATENT DOCUMENTS

| | | |
|---|---|---|
| 2004/0088385 A1 | 5/2004 | Blanchet |
| 2004/0133692 A1 | 7/2004 | Blanchet et al. |
| 2005/0138166 A1 | 6/2005 | Blanchet |
| 2006/0067322 A1 | 3/2006 | Weng |
| 2006/0114931 A1 | 6/2006 | Miyata |
| 2008/0244102 A1 | 10/2008 | Mochizuki |
| 2009/0287848 A1 | 11/2009 | Kamura |
| 2010/0289656 A1 | 11/2010 | Fujioka |
| 2011/0002220 A1 | 1/2011 | Park et al. |
| 2011/0211553 A1* | 9/2011 | Haddad ............ H04L 29/12358 370/331 |
| 2012/0044946 A1* | 2/2012 | Zhang ............... H04L 45/52 370/401 |
| 2012/0307727 A1* | 12/2012 | Yamada ............. H04L 45/586 370/328 |
| 2013/0097336 A1 | 4/2013 | Lu |
| 2015/0049669 A1* | 2/2015 | Petrescu ............. H04W 8/085 370/328 |
| 2015/0222542 A1 | 8/2015 | Inada |
| 2015/0222734 A1 | 8/2015 | Inada |

FOREIGN PATENT DOCUMENTS

| | | |
|---|---|---|
| JP | 2011-523793 A | 8/2011 |
| JP | 2013-13071 A | 1/2013 |
| JP | 2013-115639 A | 6/2013 |
| JP | 2013-126209 A | 6/2013 |
| JP | 2014-7547 A | 1/2014 |
| WO | 01/22683 A2 | 3/2001 |
| WO | 2006/053856 A1 | 5/2006 |

OTHER PUBLICATIONS

Office Action issued Jan. 5, 2016 in Japanese Patent Application No. 2014-229733 (submitting English translation only).

Office Action mailed Sep. 9, 2016, in co-pending U.S. Appl. No. 14/598,131.

U.S. Appl. No. 14/598,131, filed Jan. 15, 2015, Inada.

Final Office Action mailed Feb. 23, 2017, in co-pending U.S. Appl. No. 14/598,131.

Wu et al., RFC 5747: 4over6 Transit Solution Using IP Encapsulation and MP-BGP Extensions, Mar. 2010, Internet Engineering Task Force (IETF).

Cui et al., RFC 7596: Lightweight 4over6: An Extension to the Dual-Stack Lite Architecture, Jul. 2015, Internet Engineering Task Force (IETF).

\* cited by examiner

ELECTRONIC DEVICE, NETWORK RELAY DEVICE, AND NON-TRANSITORY COMPUTER READABLE STORAGE MEDIUM

CROSS-REFERENCE TO RELATED APPLICATIONS

The present application claims priority from Japanese Patent Application No. 2014-16797 filed on Jan. 31, 2014 and Japanese Patent Application No. 2014-229729 filed on Nov. 12, 2014, the entirety of disclosure of which is hereby incorporated by reference into this application.

TECHNICAL FIELD

The disclosure relates to relay of an Internet Protocol (IP) packet.

BACKGROUND ART

Addresses specified in Internet Protocol version 4 (IPv4) (IPv4 addresses) have conventionally been used in communication via the Internet, and depletion of newly allocatable IPv4 addresses has recently become a problem. Accordingly, introduction of Internet Protocol version 6 (IPv6) which is allowed to allocate a greater number of addresses has been started, and various software (for example, application programs) and hardware (communication terminals such as personal computer and network relay devices such as router device) compatible with IPv6 have been proposed. The communication infrastructure includes a large number of devices which are not compatible with IPv6, so that communication terminals compatible with both IPv4 and IPv6, i.e., communication terminals having the IPv4/IPv6 dual stack structure, have been proposed as the device compatible with IPv6 (see, JP 2011-523793A and JP 2013-115639A).

Network relay devices that are connected with the communication terminal having the IPv4/IPv6 dual stack structure include a network relay device configured to selectively operate in one of an operation mode of operating as a router device and an operation mode of operating as a bridge device. This network relay device maintains the same operation mode irrespective of the version of an IP which an IP packet to be relayed is compliant with, so that a problem that one of an IPv4 packet and an IPv6 packet is not normally relayed may cause in some connection mode of the communication terminal via this network relay device (network configuration). Relay of a packet according to the version of the IP has, however, not been fully discussed so far.

SUMMARY

According to one aspect of the disclosure, there is provided an electronic device that relays an Internet Protocol (IP) packet compliant with one of a plurality of IP versions includes circuitry configured to process the IP packet in each of a first mode operating as a router and a second mode operating as a bridge; and set, as a mode of the electronic device, one of the first mode or the second mode, based on which of the plurality of IP versions the IP packet to be processed is compliant with.

All the plurality of components included in the aspect of the disclosure described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the disclosure described above may be combined with part or all of the technical features included in another aspect of the disclosure described later to provide still another independent aspect of the disclosure.

For example, one aspect of the disclosure may be implemented as a device including one or more components out of two components, i.e., a packet relay processor and an operation mode setter. In other words, this device may be configured with or without the packet relay processor. This device may also be configured with or without the operation mode setter. The packet relay processor of this device may be provided, for example, as a packet relay processor that processes the IP packet in each of a first operation mode of operating as a router device and a second operation mode of operating as a bridge device The operation mode setter of this device may be provided, for example, as an operation mode setter that selectively sets one of the first operation mode and the second operation mode with respect to each version of the IP that the IP packet to be processed by the packet relay processor is compliant with, as an operation mode of the packet relay processor. This device may be implemented as a network relay device but may also be implemented by a different device other than the network relay device. This aspect solves at least one of the various problems, such as downsizing of the device, cost reduction, resource saving, energy saving, easy manufacture and improvement of usability. Part or all of the technical features in the aspect of the network relay device described above or in each of various aspects of the network relay device described later may be applied to this device.

The disclosure may be implemented by any of various other aspects. The disclosure may be implemented by, for example, a wireless LAN router device, a wireless LAN access point device, a method of relaying an IP packet, a computer program configured to implement this method and a non-transitory storage medium in which the computer program is stored.

DESCRIPTION OF EMBODIMENTS

A. First Embodiment

A1. Device Configuration

Figure 1:
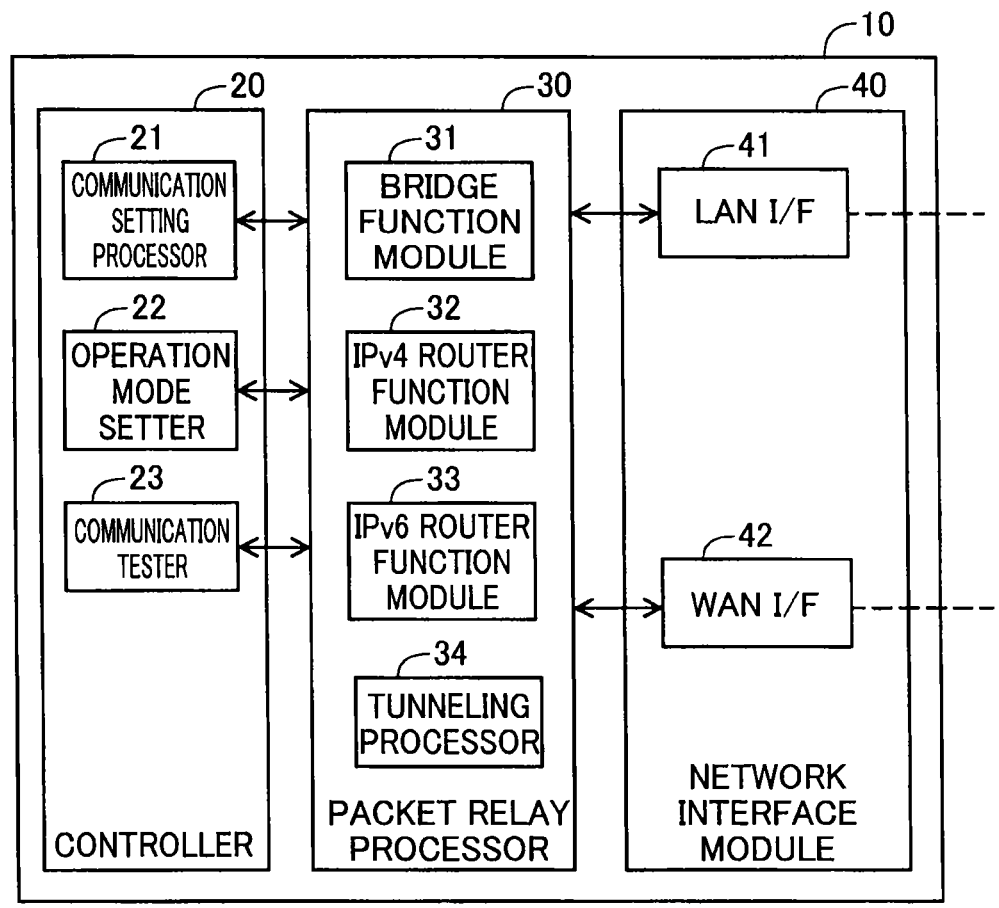
FIG. 1 is a diagram illustrating the general configuration of a network relay device according to one embodiment of the disclosure.

FIG. 1 is a diagram illustrating the general configuration of a network relay device 10 according to one embodiment of the disclosure. The network relay device 10 is configured to relay a data frame on a second layer (layer 2) of an OSI (Open Systems Interconnection) reference model. The network relay device 10 is also configured to relay a data packet on a third layer (layer 3). The network relay device 10 is connected with a communication terminal device such as a personal computer, to relay a packet with the communication terminal device as a source and a packet with the communication terminal device as a destination. The network relay device 10 supports both Internet Protocol version 4 (IPv4) and Internet Protocol version 6 (IPv6) as the layer 3 protocol.

The network relay device 10 includes a controller 20, a packet relay processor 30 and a network interface 40. According to this embodiment, the respective functions of the controller 20, the packet relay processor 30 and the network interface 40 are implemented by the operations of electronic circuits included in the network relay device 10 according to their physical circuit structure. In another embodiment, a CPU (Central Processing Unit) or an ASIC (Application Specific Integrated Circuit) may be operated according to a specified program, so as to implement at least one of the functions of the network relay device 10.

The controller 20 controls the respective components of the network relay device 10. According to this embodiment, the controller 20 includes a communication setting processor 21, an operation mode setter 22 and a communication tester 23.

The communication setting processor 21 of the controller 20 is configured to perform a process of setting information required for making communication using IPv4 not via IPv4 over IPv6 tunnel (hereinafter referred to as "communication setting process"). The communication setting processor 21 has a pre-stored IPv6 address of a device terminating the IPv4 over IPv6 tunnel (hereinafter referred to as "AFTR" (Address Family Transfer Router)). The details of the communication setting process will be described later. The IPv4 over IPv6 tunnel is a communication path for capsulation of an IPv4 packet (layer 3 packet compliant with IPv4) into an IPv6 packet (layer 3 packet compliant with IPv6) and sending the capsulated packet (for example, communication path formed by tunneling technique of Dual-Stack Lite (DS Lite) system). The operation mode setter 22 of the controller 20 is configured to set the operation mode of the packet relay processor 30. The communication tester 23 of the controller 20 is configured to perform a tunneling availability checking process described later.

The packet relay processor 30 serves to relay a layer 2 frame and a layer 3 packet received by the network relay device 10. The packet relay processor 30 includes a bridge function module 31, an IPv4 router function module 32, an IPv6 router function module 33 and a tunneling processor 34.

The bridge function module 31 of the packet relay processor 30 is configured to relay a layer 2 frame. When Ethernet (registered trademark) is used as the layer 2 protocol, the bridge function module 31 refers to an MAC address table to specify a relay destination port based on a source Media Access Control (MAC) address and a destination MAC address indicated in a header of an Ethernet frame and sends the frame via the specified relay destination port. The bridge function module 31 performs the processing involved in relay of the frame, so that the network relay device 10 operates as a bridge device.

The IPv4 router function module 32 of the packet relay processor 30 is configured to perform processing based on IPv4. The IPv4 router function module 32 relays an IPv4 packet, based on routing information (routing table) registered in advance in the IPv4 router function module 32. According to another embodiment, the IPv4 router function module 32 may perform a routing protocol such as Routing Information Protocol (RIP) or Open Shortest Path First (OSPF) to obtain the routing information. The IPv4 router function module 32 performs the processing involved in relay of the IP4 packet, so that the network relay device 10 operates as an IPv4 router device which is a router device configured to relay the IPv4 packet.

The IPv6 router function module 33 of the packet relay processor 30 is configured to perform processing based on IPv6. The IPv6 router function module 33 obtains routing information according to a specified protocol and relays an IPv6 packet based on the obtained routing information. In other words, the IPv6 router function module 33 relays an IPv6 packet on the layer 3. The protocol employed by the IPv6 router function module 33 to obtain the routing information may be, for example, a routing protocol such as RIP ng (RIP next generation) or OSPF v3 or DHCP (Dynamic Host Configuration Protocol) v6. The IPv6 router function module 33 performs the processing involved in relay of the IPv6 packet, so that the network device 10 operates as an IPv6 router device which is a router device configured to relay the IPv6 packet.

The network interface module 40 serves as an interface to connect the network relay device 10 with another device. The network interface module 40 includes a LAN I/F 41 and a WAN I/F 42.

The LAN I/F 41 of the network interface module 40 is an interface to connect with a device located on a Local Area Network (LAN) side relative to the network relay device 10. The LAN side herein means a downstream side of the network relay device 10 or more specifically a network side farther from the Internet in networks which the network relay device 10 belongs to. In this embodiment, the LAN I/F 41 is an interface (first layer and second layer in the OSI reference model) according based on a wired LAN defined by The Institute of Electrical and Electronics Engineers (IEEE) 802.3 (for example, gigabit Ethernet (Ethernet is registered trademark) defined by IEEE 802.3z and IEEE 802.3ab).

The WAN I/F 42 of the network interface module 40 is an interface to connect with a device located on a WAN side relative to the network relay device 10. The WAN side herein means an upstream side of the network relay device 10 or more specifically a network side closer to the Internet in networks which the network relay device 10 belongs to. In this embodiment, the WAN I/F 42 is an interface based on a wired LAN defined by IEEE 802.3, like the LAN I/F 41.

The packet relay processor 30 operates as the bridge device based on the bridge function module 31, while operating as the router device based on the IPv4 router function module 32 and the IPv6 router function module 33.

Among various operation modes of the packet relay processor 30, an operation mode in which the packet relay processor 30 operates as the router device (IPv4 router device and IPv6 router device) based on the IPv4 router function module 32 and the IPv6 router function module 33 is called "first operation mode". Among the various operation modes of the packet relay processor 30, an operation mode in which the packet relay processor 30 operates as the bridge device based on the bridge function module 31 is called "second operation mode". The operation mode setter 22 performs an operation mode setting process described later to set either the first operation mode or the second operation mode as the operation mode of the packet relay processor 30. The packet relay processor 30 operates according to the operation mode set by the operation mode setter 22. According to this embodiment, the bridge function module 31 of the packet relay processor 30 performs a process of receiving a layer 2 frame including an IPv4 packet or an IPv6 packet from one of the LAN I/F 41 and the WAN I/F 42 and relaying the received layer 2 frame to the other I/F.

At least part of the function modules of the packet relay processor 30 may be configured in a common integrated circuit shared with at least part of the function modules of the network interface module 40. For example, the bridge function module 31 and the LAN I/F 41 may be implemented by a common ASIC.

Figure 2:
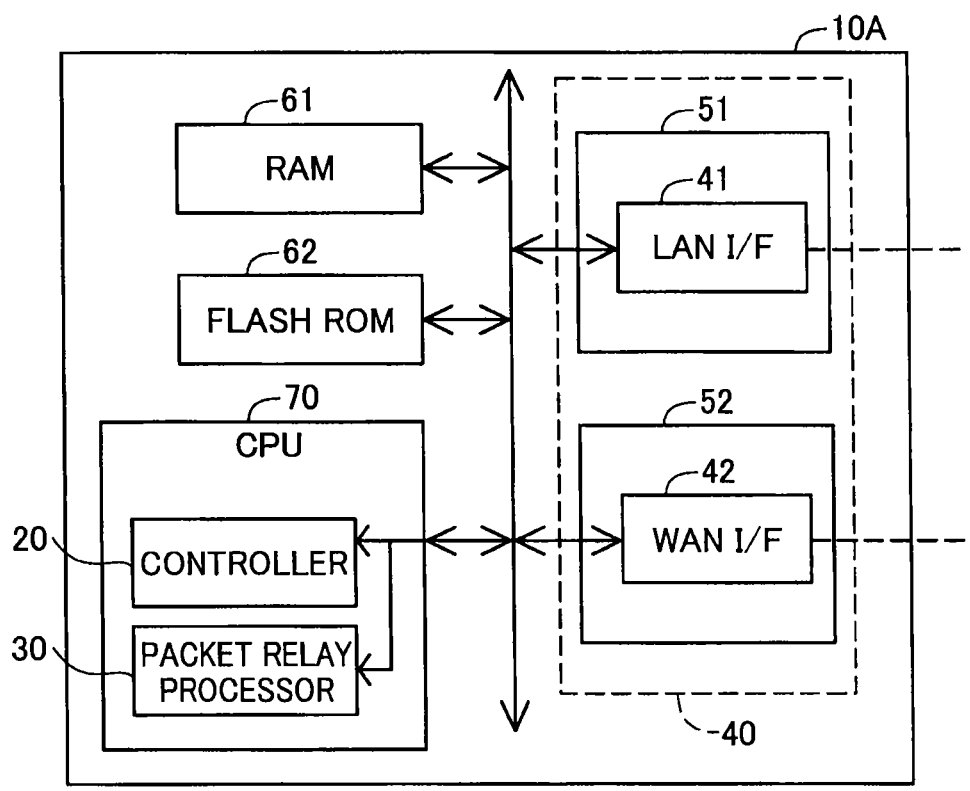
FIG. 2 is a diagram illustrating one example of the general configuration of a network relay device according to another embodiment.

FIG. 2 is a diagram illustrating one example of the general configuration of a network relay device 10A according to another embodiment. The network relay device 10A includes a first network interface circuit 51, a second network interface circuit 52, a Random Access Memory (RAM) 61, a flash Read Only Memory (ROM) 62 and a Central Processing Unit (CPU) 70. The first network interface circuit 51, the second network interface circuit 52, the RAM 61, the flash ROM 62 and the CPU 70 are interconnected by an internal bus. The first network interface circuit 51 and the second network interface circuit 52 are formed on a circuit board having ASICs (not shown) mounted thereon for performing a variety of processes of a wired LAN (for example, medium access control process). In another embodiment shown in FIG. 2, the first network interface circuit 51 operates as the LAN I/F 41 in the embodiment of FIG. 1. The second network interface circuit 52 operates as the WAN I/F 42 in the embodiment of FIG. 1. The CPU 70 reads a control program stored in the flash ROM 62 and loads and executes the control program on the RAM 61, so as to serve as the controller 20 and the packet relay processor 30 in the embodiment of FIG. 1.

A2. Connection Mode

Figure 3:
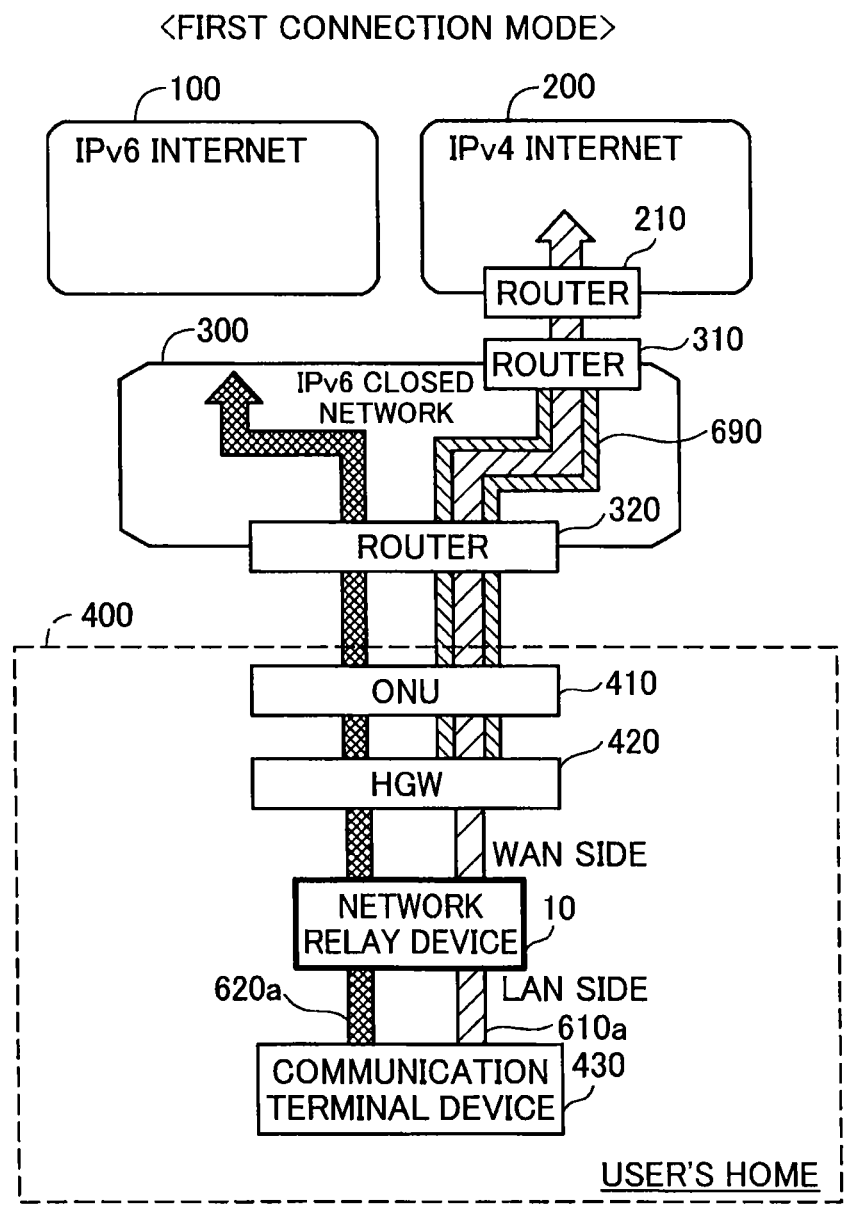
FIG. 3 is a diagram illustrating a first connection mode using the network relay device.
Figure 4:
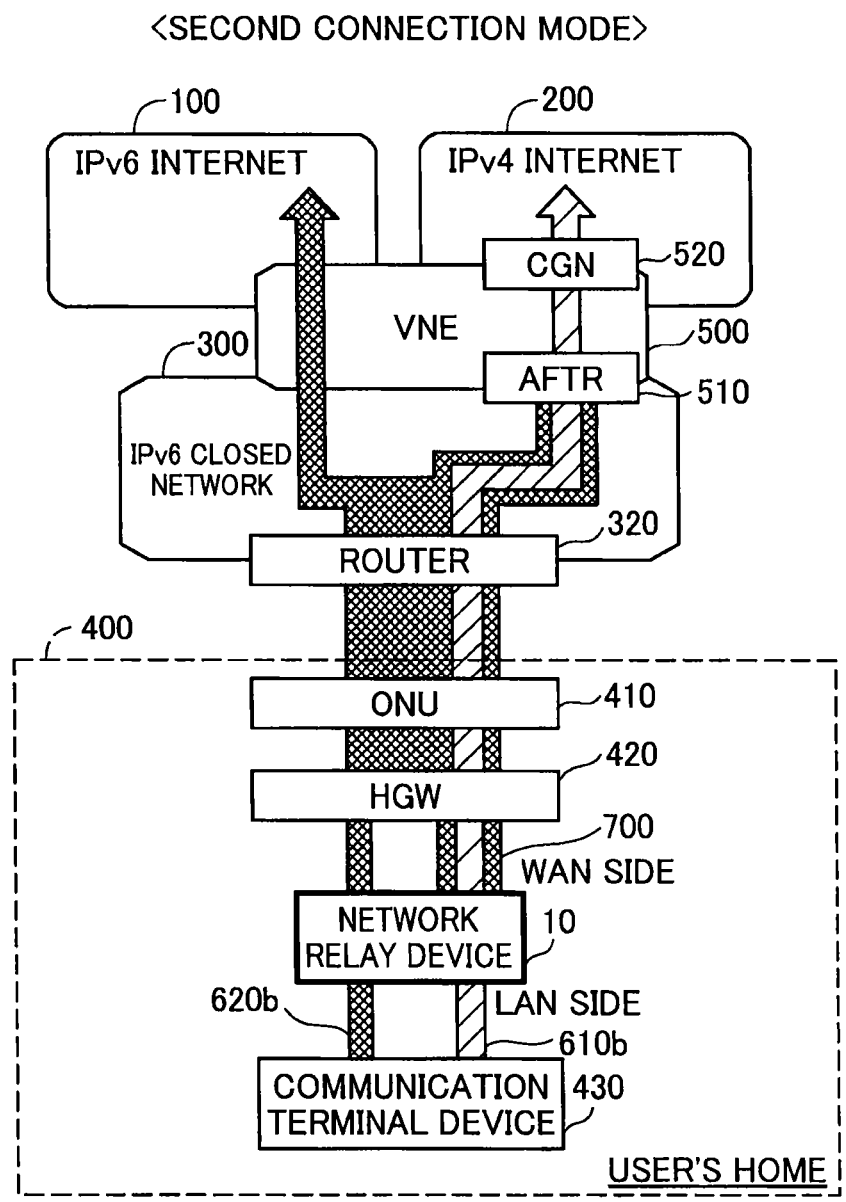
FIG. 4 is a diagram illustrating a second connection mode using the network relay device.
Figure 5:
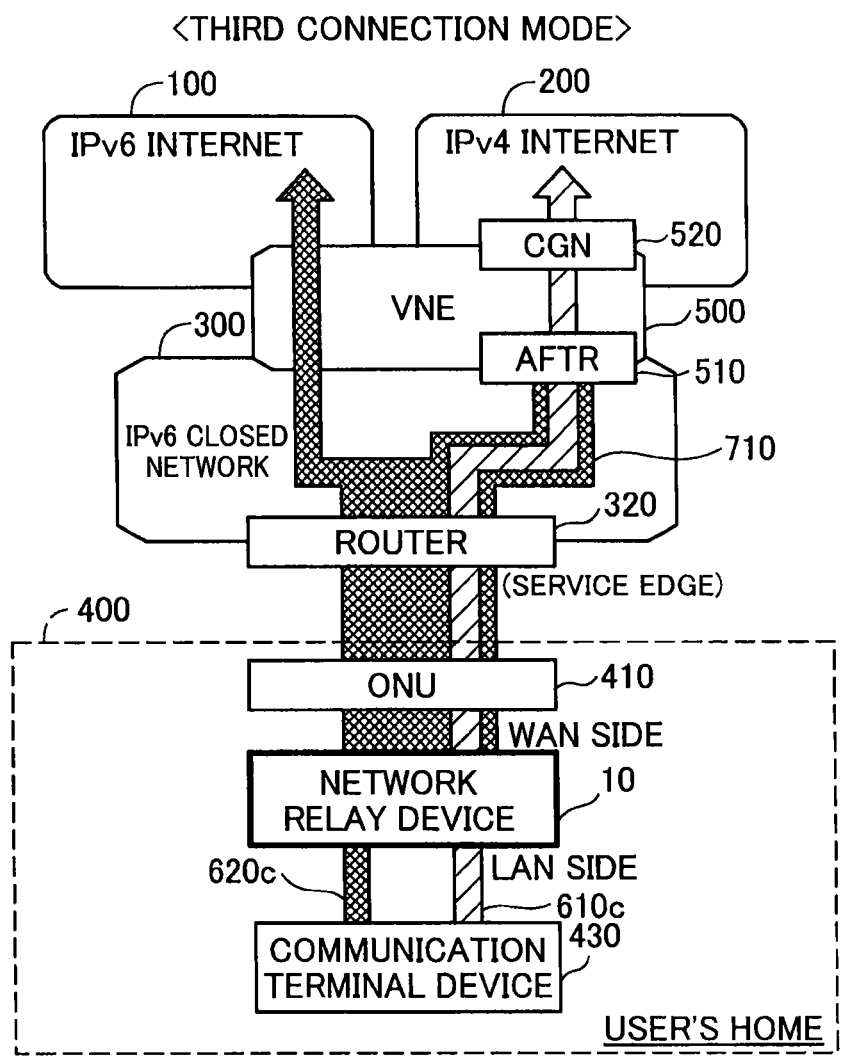
FIG. 5 is a diagram illustrating a third connection mode using the network relay device.
Figure 6:
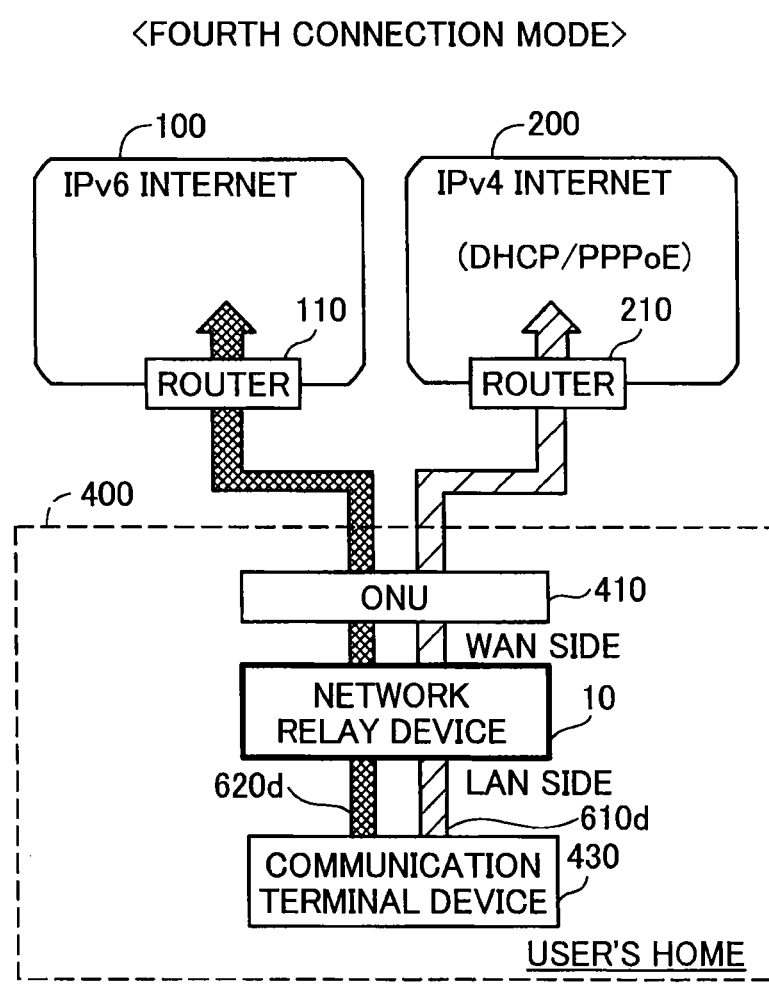
FIG. 6 is a diagram illustrating a fourth connection mode using the network relay device.

There may be various connection modes employed as the connection mode for connecting a communication terminal device to the Internet using the network relay device 10. FIG. 3 is a diagram illustrating a first connection mode using the network relay device 10. FIG. 4 is a diagram illustrating a second connection mode using the network relay device 10. FIG. 5 is a diagram illustrating a third connection mode using the network relay device 10. FIG. 6 is a diagram illustrating a fourth connection mode using the network relay device 10.

A2-1. First Connection Mode

In the first connection mode shown in FIG. 3, the network relay device 10 is placed in a user's home 400. In the first connection mode, a communication terminal device 430 in the user's home 400 is connectable to the IPv4 Internet 200 via a closed network 300. The communication terminal device 430 is, on the other hand, not connectable to the IPv6 Internet 100. The IPv4 Internet 200 is the Internet by devices (for example, communication terminal device and network relay device) which make communication using IPv4. The IPv6 Internet 100 is the Internet by devices (for example, communication terminal device and network relay device) which make communication using IPv6. The details of the closed network 300 will be described later.

The communication terminal device 430, a home gateway device (HGW) 420 and an optical network unit (ONU) 410 are placed, in addition to the network relay device 10, in the user's home 400.

The communication terminal device 430 is connected with the LAN side (LAN I/F 41) of the network relay device 10, whereas the home gateway device 420 is connected with the WAN side (WAN I/F 42) of the network relay device 10.

The communication terminal device 430 is connected with the network relay device 10. According to this embodiment, the network relay device 10 and the communication terminal device 430 are directly connected with each other by a network cable, and the network relay device 10 and the communication terminal device 430 belong to one identical LAN. According to this embodiment, the LAN which both the network relay device 10 and the communication terminal device 430 belong to is Ethernet (registered trademark). The communication terminal device 430 is provided as a device that can make communication compatible with IPv4 and IPv6. According to this embodiment, the communication terminal device 430 is implemented by a personal computer. The communication terminal device 430 may alternatively be implemented by any arbitrary device that can make communication compliant with IPv4 and IPv6, such as a network attached storage, a multi-function mobile phone (smartphone) and a tablet computer.

The home gateway device 420 is a router device corresponding to a customer network terminating unit (CTU). The home gateway device 420 is connected to the closed network 300 via the optical network unit 410. The home gateway device 420 has the LAN side connected with the network relay device 10. The home gateway device 420 can make communication using IPv4 and IPv6. The home gateway device 420 can also make communication using PPP over Ethernet (PPPoE (Ethernet is registered trademark)). The home gateway device 420 serves as a gateway in a network in the user's home 400. The device configuration of the home gateway device 420 is similar to the device configuration of a general router device for home use and is not specifically described here in detail. The optical network unit 410 terminates an optical access line connecting the closed network 300 with the network in the user's home 400.

The closed network 300 is a network configured to relay an IPv4 packet (for example, IPv4 packet sent and received by PPPoE) as well as an IPv6 packet. According to this embodiment, the closed network 300 is provided by a telecommunications carrier as a network formed by a group of network relay devices. The closed network 300 itself is not directly connected to the IPv4 Internet 200 or the IPv6 Internet 100. The closed network 300 includes a router device 310 and another router device 320. The router device 310 is connected with a router device 210 provided by an Internet Service Provider (ISP). The closed network 300 is connected to the IPv4 Internet 200 via the router device 210 (and a network provided by the ISP). The router device 320 is a router device functioning as service edge. The router device 320 connects different types of data transmission networks with each other and serves to perform data conversion between these data transmission networks and perform route determination and relay of the converted data (i.e., routing). According to this embodiment, the router device 320 is configured to connect a transmission network which is formed by using an optical fiber connecting a telecommunications carrier base with home to a transmission network which is formed to connect bases with each other. According to this embodiment, a plurality of network relay devices (not shown) are placed between the router device 320 and the router device 310 in the closed network 300. According to this embodiment, various server devices providing communication services, for example, a PPPoE serve, a DHCP server and an Session Initiation Protocol (SIP) server, are placed in the closed network 300.

IPv4 communication 610a denotes communication relating to the IPv4 packet which is sent and received by the communication terminal device 430. The IPv4 communication 610a is established between a device (not shown) in the IPv4 Internet 200 and the communication terminal device 430 via the network relay device 10, the home gateway device 420, the optical network unit 410, the router device 320, the router device 310 and the router device 210. A PPPoE tunnel 690 using PPPoE is formed between the home gateway device 420 and the router device 310. The PPPoE tunnel 690 is a communication path using PPPoE to relay an IPv4 packet. The IPv4 communication 610 in the closed network 300 is established via this PPPoE tunnel 690.

IPv6 communication 620a denotes communication relating to the IPv6 packet which is sent and received by the communication terminal device 430. The IPv6 communication 620a is established between a device (not shown) in the closed network 300 and the communication terminal device 430 via the network relay device 10, the home gateway device 420, the optical network unit 410 and the router device 320. The IPv6 communication 620a is not established between a device in the IPv6 Internet 100 and the communication terminal device 430.

In the first connection mode shown in FIG. 3, the network relay device 10 operates as the bride device with respect to both relay of the IPv4 packet and relay of the IPv6 packet, so as to establish the IPv4 communication 610a and the IPv6 communication 620a.

A2-2. Second Connection Mode

The second connection mode shown in FIG. 4 is similar to the first connection mode shown in FIG. 3, except that the closed network 300 is connected with the IPv6 Internet 100 and with the IPv4 Internet 200 via a VNE network 500, that the PPPoE tunnel 690 is omitted and that an IPv4 over IPv6 tunnel 700 is formed between the network relay device 10 and the VNE network 500.

The VNE network 500 is a network provided by a Virtual Network Enabler (VNE). The VNE network 500 includes an AFTR 510 and a CGN (Carrier Grade NAT) 520. The AFTR 510 performs capsulation of an IPv4 packet into an IPv6 packet and extraction (decapsulation) of an IPv4 packet from an IPv6 packet. In other words, the AFTR 510 terminates the IPv4 over IPv6 tunnel 700. The CGN 520 is a device called Large Scale NAT (LST) and serves to perform mutual conversion between an IPv4 private address and an IPv4 global address. According to this embodiment, both the AFTR 510 and the CGN 520 operate as the router devices.

IPv4 communication 610b terminating at the communication terminal device 430 is established between a device (not shown) in the IPv4 Internet 200 and the communication terminal device 430 via the IPv4 over IPv6 tunnel 700 between the network relay device 10 and the AFTR 510 and the VNE network 500. The home gate way device 420 is not compatible with DS Lite and can thus not terminate the IPv4 over IPv6 tunnel.

IPv6 communication 620b terminating at the communication terminal device 430 is established between a device (not shown) in the IPv6 Internet 100 and the communication terminal device 430 via the VNE network 500.

In the second connection mode shown in FIG. 4, the network relay device 10 operates as the router device with respect to relay of the IPv4 packet, while operating as the bridge device with respect to relay of the IPv6 packet, so as to establish the IPv4 communication 610b and the IPv6 communication 620b.

A2-3. Third Connection Mode

The third connection mode shown in FIG. 5 is similar to the second connection mode shown in FIG. 4, except that the home gateway device 420 is omitted and that an IPv4 over IPv6 tunnel 710 is formed between the network relay device 10 and the VNE network 500.

In the third connection mode, no network relay device is present on the upstream side of the network relay device 10 in the user's home 400. Accordingly, in the third connection mode, the network relay device 10 operates as the gateway device in the user's home 400.

IPv4 communication 610c terminating at the communication terminal device 430 is established between a device (not shown) in the IPv4 Internet 200 and the communication terminal device 430 via the IPv4 over IPv6 tunnel 710 and the VNE network 500. IPv6 communication 620c terminating at the communication terminal device 430 is established in the same manner as the IPv6 communication 620b in the second connection mode.

In the third connection mode shown in FIG. 5, the network relay device 10 operates as the router device with respect to both relay of the IPv4 packet and relay of the IPv6 packet, so as to establish the IPv4 communication 610c and the IPv6 communication 620c.

A2-4. Fourth Connection Mode

The fourth connection mode shown in FIG. 6 is similar to the first connection mode shown in FIG. 3, except that the home gateway device 420 is omitted in the network of the user's home 400, that the closed network 300 is omitted and that the optical network unit 410 is connected with a router device 110 in the IPv6 Internet 100 and with a router device 210 in the IPv4 Internet 200.

In the fourth connection mode, the router device 110 in the IPv6 Internet 100 belongs to an IPv6 network provided by a telecommunications carrier (network different from the closed network 300). In the fourth connection mode, the router device 210 in the IPv4 Internet 200 belongs to an IPv4 network provided by a telecommunications carrier. A DHCP server or a PPPoE server is provided in this IPv4 network to allocate an IP address to the network relay device 10.

IPv4 communication 610d terminating at the communication terminal device 430 is established between a device (not shown) in the IPv4 Internet 200 and the communication terminal device 430 via the network relay device 10, the optical network unit 410 and the router device 210. IPv6 communication 620d terminating at the communication terminal device 430 is established between a device (not shown) in the IPv6 Internet 100 and the communication terminal device 430 via the network relay device 10, the optical network unit 410 and the router device 110.

In the fourth connection mode shown in FIG. 6, the network relay device 10 operates as the router device with respect to relay of the IPv6 packet, so as to establish the IPv6 communication 620d. In the fourth connection mode, the operation mode of the network relay device 10 with respect to relay of the IPv4 packet depends on the address allocation system in the IPv4 network. More specifically, when the IP address is allocated from the DHCP server, the network relay device 10 operates as the bridge device. When the IP address is allocated from the PPPoE server, on the other hand, the network relay device 10 operates as the router device.

A2-5. Summary of Connection Modes

As described above, the operation mode with respect to relay of an IP packet in the network relay device 10 (operation mode of the packet relay processor 30) may differ according to the first to the fourth connection modes. The operation mode may also differ according to the version of the IP which a packet to be relayed is compliant with. In the network relay device 10 of the embodiment, an operation mode setting process described later is performed to automatically set the operation mode of the packet relay processor 30 corresponding to the connection mode with respect to each version of the IP, so as to reduce the user's load in setting the operation mode.

A3. Operation Mode Setting Process

Figure 7:
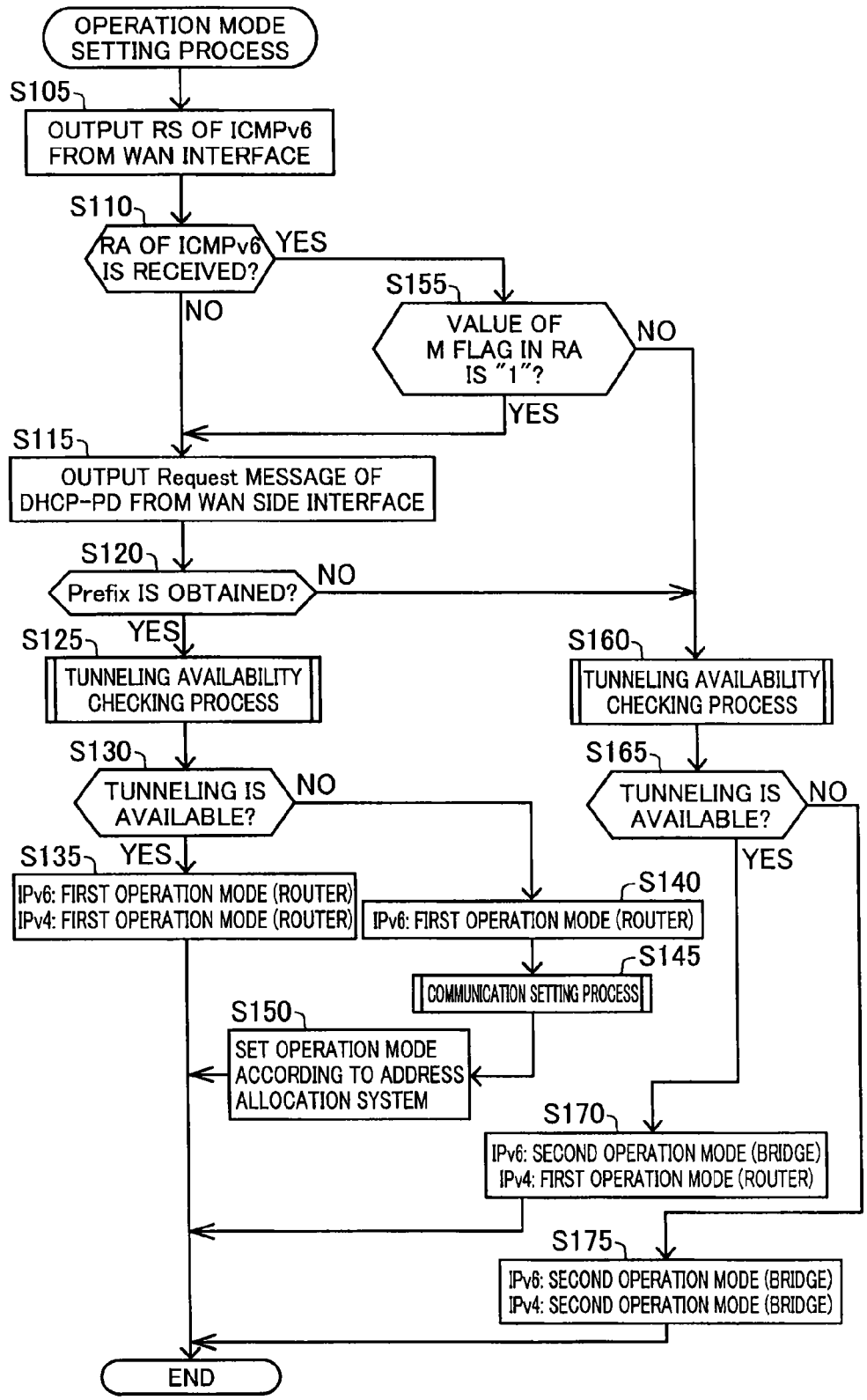
FIG. 7 is a flowchart showing a procedure of operation mode setting process according to the first embodiment.

FIG. 7 is a flowchart showing a procedure of operation mode setting process according to the first embodiment. The operation mode setting process is triggered in the network relay device 10 in response to link-up of a port in the WAN I/F 42 after power supply to the network relay device 10.

The controller 20 enables the operation mode setting module 22 to perform the operation mode setting process. The controller 20 operates as an RS output module to control the IPv6 router function module 33 and output an Router Solicitation (RS) message (hereinafter simply referred to as "RS") specified in ICMPv6 from the WAN I/F 42 (step S105). Subsequently the controller 20 determines whether an Router Advertisement (RA) message (hereinafter simply referred to as "RA") responding to the RS is received by the network relay device 10 in a predetermined time period (step S110). For example, in the case where the router device compatible with IPv6 (home gateway device 420) is connected with the WAN side (upstream side) of the network relay device 10 like the first connection mode or the second connection mode described above, the RA is received by the network relay device 10 in the predetermined time period. In the case where the router device compatible with IPv6 is not connected with the WAN side (upstream side) of the network relay device 10 like the third connection mode or the fourth connection mode described above, on the other hand, the RA is not received by the network relay device 10 in the predetermined time period.

When the RA is received by the network relay device 10 (step S110: YES), the controller 20 checks the value of an Managed Flag (M flag) in the RA and determines whether the value of the M flag is equal to "1" (step S155). As defined in ICMPv6, the M flag is a flag used to specify an acquisition source of address information and is set to either a value "0" or a value "1". The value of the M flag equal to "1" means that an IP address (IPv6 address) is to be obtained from the DHCP server using DHCPv6 (so-called stateful). The value of the M flag equal to "0" means that an IP address (IPv6 address) is to be generated by itself using an address prefix included in the RA and that no authority is given to distribute an IP address (address prefix) to any lower level device (so-called stateless).

When the value of the M flag is equal to "1" (step S155: YES) or when the RA is not received by the network relay device 10 (step S110: NO), the controller 20 operates as a request output module to output a request message for an address prefix (Request message) used in the address prefix allocation system called DHCP-Prefix Delegation (DHCP-PD) from the WAN I/F 42 (step S115). Subsequently the controller 20 receives a reply message (Reply message) responding to the Request message and determines whether an address prefix included in the Reply message is received (step S120). The controller 20 may output a Solicit message in DHCP-PD prior to output of the Request message, in order to search for a DHCP server device.

The address prefix is information indicating a range of network address. Receiving and obtaining an address prefix allows the network relay device 10 receiving an RS to redistribute the address prefix in the range of the received address prefix. For example, in the case where the router device compatible with IPv6 is not connected with the WAN side (upstream side) of the network relay device 10 like the third connection mode or the fourth connection mode described above, the network relay device 10 receives an address prefix from a DHCP server (not shown) on the WAN side (in the closed network 300). In this case, the network relay device 10 operates as the router device which replies an RA when receiving an RS from a connected device (communication terminal device 430). The DHCP server in the closed network 300 may be, for example, a router device in the closed network 300.

When the address prefix is received (step S120: YES), the controller 20 enables the communication tester 23 to perform a tunneling availability checking process (step S125). The tunneling availability checking process (step S125) is a process of checking whether IPv4 communication (tunneling) is available or unavailable via the IPv4 over IPv6 tunnel formed between the network relay device 10 and the AFTR 510.

Figure 8:
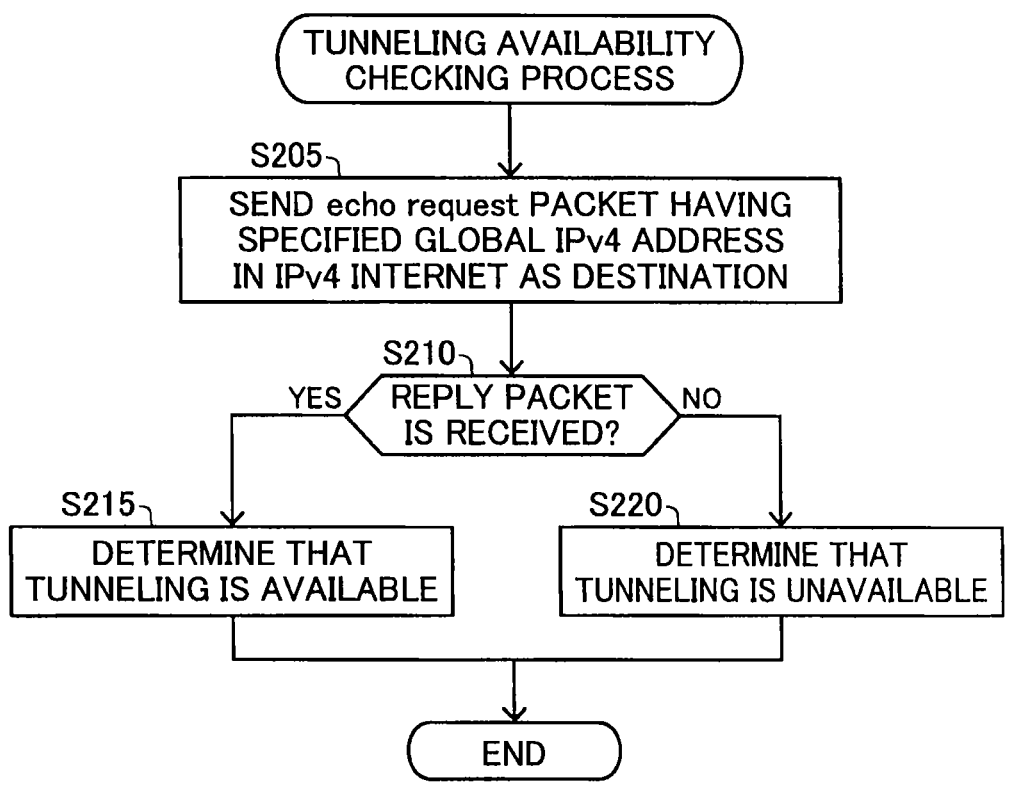
FIG. 8 is a flowchart showing a procedure of tunneling availability checking process according to the first embodiment.

FIG. 8 is a flowchart showing a procedure of tunneling availability checking process according to the first embodiment. The controller 20 enables the communication tester 23 to perform the tunneling availability checking process. The controller 20 controls the IPv4 router function module 32 to output an echo request packet of ICMP (so-called Ping packet) having a specified global IPv4 address as the destination via the WAN I/F 42 (step S205). The echo request packet is output via the IPv4 over IPv6 tunnel formed by the tunneling processor 34. The specified global IPv4 address may be, for example, an IPv4 address set on the LAN side of the CNG 520 or an IPv4 address of a WWW server managed by the manufacturer of the network relay device 10.

The controller 20 subsequently determines whether a reply packet (echo reply packet) responding to the echo request packet is received by the network relay device 10 in a predetermined time period (step S210). When the echo reply packet is received, the controller 20 determines that tunneling is available (step S215). When the echo reply packet is not received, the controller 20 determines that tunneling is unavailable (step S220). For example, in the case where the IPv4 over IPv6 tunnel 700 is formed between the network relay device 10 and the AFTR 510 and where a permission for tunneling service to the IPv6 address of the network relay device 10 is given to the AFTR 510 like the second connection mode shown in FIG. 4, the echo request packet output from the network relay device 10 reaches the device specified as the destination, and the network relay device 10 receives the reply packet (echo reply packet).

In the case where the IPv4 over IPv6 tunnel is not formed between the network relay device 10 and the AFTR 510, on the other hand, the network relay device 10 does not receive the reply packet (echo reply packet). In the case where the IPv4 over IPv6 tunnel is formed but a permission for tunneling service to the IPv6 address of the network relay device 10 is not given to the AFTR 510 or in the case that communication is unavailable due to, for example, power-off of a device which a specified IPv4 address is allocated to, the network relay device 10 does not receive the reply packet.

Returning to the description of FIG. 7, after completion of the tunneling availability checking process (step S125), when the tunneling is available (step S130: YES), the controller 20 sets the first operation mode (router) with respect to relay of the IPv6 packet and sets the first operation mode (router) with respect to relay of the IPv4 packet, as the operation mode of the packet relay processor 30 (step S135).

In the case that step S135 is performed, the address prefix has been obtained at step S120, so that the network relay device 10 operates as the router device compatible with IPv6 and allowed to redistribute the address prefix. In this case, the router device allowed to redistribute the address prefix is not connected on the WAN side of the network relay device 10. In other words, in the case that step S135 is performed, either the third connection mode shown in FIG. 5 or the fourth connection mode shown in FIG. 6 is assumed with respect to relay of the IPv6 packet. Accordingly the controller 20 sets the network relay device 10 as the router device with respect to relay of the IPv6 packet at step S135.

In the case that step S135 is performed, IPv4 communication via the IPv4 over IPv6 tunnel is available. In this case, the third connection mode is thus estimated out of the third and the fourth connection modes assumed based on acquisition of the address prefix described above. The controller 20 accordingly sets the network relay device 10 as the router device with respect to relay of the IPv4 packet at step S135.

At step S135, the controller 20 also stores information regarding the operation modes respectively set for IPv4 and IPv6 (first operation mode) in a volatile memory (for example, RAM 61) included in the network relay device 10. The packet relay processor 30 then determines which function module of the packet relay processor 30 is to be enabled to process (relay) an IP packet which is to be received or sent, based on the information stored in this volatile memory.

When tunneling is unavailable (step S130: NO), the controller 20 sets the first operation mode (router) with respect to relay of the IPv6 packet as the operation mode of the packet relay processor 30 (step S140). The reason why the first operation mode is set with respect to relay of the IPv6 packet at step S140 is the same as the reason why the first operation mode is set with respect to relay of the IPv6 packet at step S135 described above.

In the case that step S140 is performed, the address prefix has been obtained at step S120 and it has been determined at step S125 that IPv4 communication via the IPv4 over IPv6 tunnel is unavailable. Accordingly, in the case that step S140 is performed, the fourth connection mode shown in FIG. 6 is assumed. As described above, in the fourth connection mode, the operation mode of the network relay device 10 with respect to relay of the IPv4 packet depends on the address allocation system in the IPv4 network. According to this embodiment, the controller 20 performs a communication setting process (step S145) after performing step S140, so as to identify the IPv4 address allocation system and set, for example, an IPv4 address and an IP address of a Domain Name System (DNS) server in the network relay device 10. Subsequently the controller 20 sets the operation mode of the packet relay processor 30 with respect to relay of the IPv4 packet according to the IPv4 address allocation system.

Figure 9:
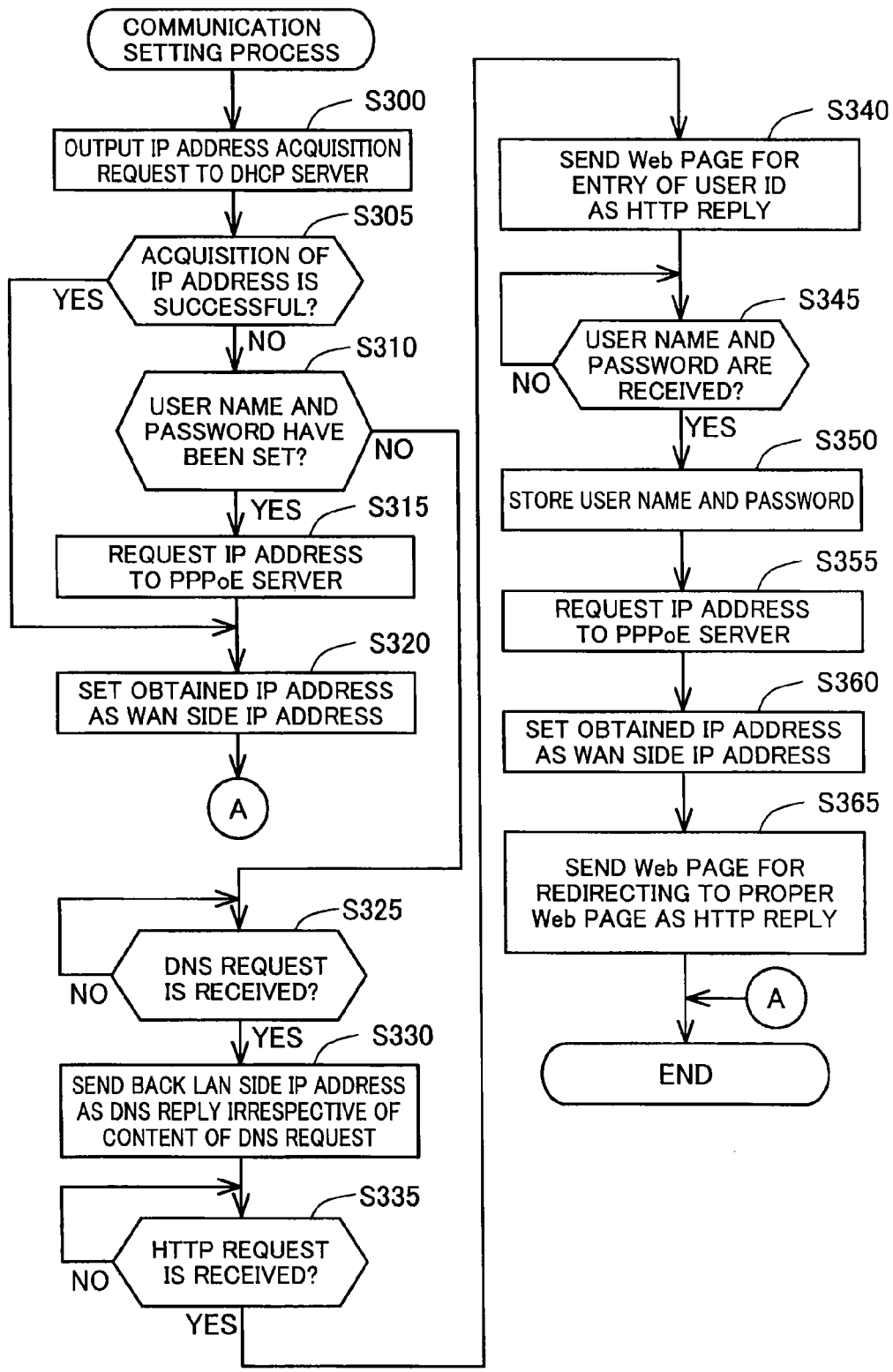
FIG. 9 is a flowchart showing a detailed procedure of the communication setting process according to the first embodiment.

FIG. 9 is a flowchart showing a detailed procedure of the communication setting process according to the first embodiment. The controller 20 enables the communication setting processor 21 to perform the communication setting process. The controller 20 outputs an IPv4 address acquisition request to a DHCP server via the WAN I/F 42 (step S300). The controller 20 subsequently determines whether a reply is received by the network relay device 10 in a predetermined time period and acquisition of an IP address is successful (step S305). The IP address acquisition request may be output by broadcasting a message called DHCP discover.

When acquisition of an IP address is successful (step S305: YES), the controller 20 sets the received IP address as the IPv4 address on the WAN side of the network relay device 10 (step S320). The controller 20 then terminates the communication setting process. In this case, the controller 20 sets the allocation system from the DHCP server as the IPv4 address allocation system.

When acquisition of an IP address is failed (step S305: NO), the controller 20 determines whether a user name and a password used for connection authentication to a PPPoE server (not shown) have been set (whether the user name and the password have been stored in a memory (not shown) of the controller 20), in order to receive allocation of an IP address from the PPPoE server (step S310). When the user name and the password have already been set (step S310: YES), the controller 20 outputs the settings of the user name and the password via the WAN I/F 42 and also outputs an IPv4 address acquisition request (step S315). On successful authentication using the received user name and password, the PPPoE server (not shown) in the IPv4 network sends back an IPv4 address to the network relay device 10. When receiving the IPv4 address, the controller 20 sets the received IP address as the IPv4 address on the WAN side of the network relay device 10 (step S320). In this case, the controller 20 sets the allocation system from the PPPoE server as the IPv4 address allocation system.

When the user name and the password have not yet been set (step S310: NO), the controller 20 waits for receiving a DNS request from the communication terminal device 430 (step S325). The communication terminal device 430 outputs a server name included in the Uniform Resource Locator (URL) of a predefined homepage as a DNS request, after activation of a Web browser program.

When receiving the DNS request (step S325: YES), the controller 20 sends back an IPv4 address (private address, for example, "192.168.0.1") allocated in advance to the LAN I/F 41 of the network relay device 10 as a DNS reply (step S330), irrespective of the content of this DNS request. The IP address sent back as the DNS reply is a private address and is accordingly different from a requested correct IP address corresponding to the server name. When receiving the DNS reply including such a private address, a Web browser of the communication terminal device 430 determines that the received address is different from the correct IP address corresponding to the server name mentioned above and sends an Hypertext Transfer Protocol (HTTP) request having this received address as a destination address.

When receiving the HTTP request described above from the communication terminal device 430 (step S335: YES), the controller 20 sends a Web page for entering a user name and a password for authentication in PPPoE as an HTTP reply to the communication terminal device 430 (step S340). When receiving the HTTP reply, the communication terminal device 430 displays a Web page (screen) for entry of the user name and the password. When the user enters the user name and the password in this screen, the communication terminal device 430 sends the entered user name and password as an HTTP request to the network relay device 10.

When receiving a user name and a password from the communication terminal device 430 (step S345: YES), the controller 20 stores the received user name and password in a memory (for example, flash ROM 62) included in the network relay device 10 (step S350).

The controller 20 subsequently reads out the user name and the password stored in the memory to send the user name and the password to the PPPoE server and also outputs an IPv4 address acquisition request (step S355). The processing of step S355 is identical with the processing of step S315 described above.

After receiving an IPv4 address, the controller 20 sets the received IPv4 address as the IPv4 address on the WAN side of the network relay device 10 (step S360) in the same manner as step S320 described above. In this case, the controller 20 sets the allocation system from the PPPoE server as the IPv4 address allocation system.

The controller 20 inquires of a DNS server (not shown) provided in advance in the IPv4 network about a proper IPv4 address corresponding to the server name specified in the previously received DNS request and sends a Web page for redirecting the obtained IPv4 address as an HTTP reply to the communication terminal device 430 (step S365). The communication terminal device 430 then accesses to a proper Web page, based on a redirect instruction described in the Web page received from the network relay device 10. The communication terminal device 430 accordingly displays the Web page corresponding to the predefined homepage address.

The communication setting process described above identifies the IPv4 address allocation system and allocates an IPv4 address to the WAN I/F 42 of the network relay device 10.

Returning to the description of FIG. 7, after completion of the communication setting process (step S145), the controller 20 sets the operation mode of the packet relay processor 30 with respect to relay of the IPv4 packet according to the IPv4 address allocation system identified in the communication setting process (step S150). More specifically, when the IPv4 address allocation system is the allocation system from the DHCP server, the controller 20 sets the operation mode of the packet relay processor 30 with respect to relay of the IPv4 packet to the second operation mode (bridge). When the IPv4 address allocation system is the allocation system from the PPPoE server, on the other hand, the controller 20 sets the operation mode of the packet relay processor 30 with respect to relay of the IPv4 packet to the first operation mode (router).

When it is determined that the value of the M flag in the RA is not equal to "1", in other words, when it is determined that the value of the M flag in the RA is equal to "0" (step S155: NO) or when the address prefix is not received in the Reply message (step S120: NO), the controller 20 enables the communication tester 23 to perform a tunneling availability checking process (step S160). The tunneling availability checking process (step S160) is similar to the tunneling availability checking process (step S125). The controller 20 may generate an IPv6 address by itself based on the address prefix included in the received RA (address prefix which is not allowed to be redistributed), before or after the tunneling availability checking process (step S160).

When tunneling is available (step S165: YES), the controller 20 sets the second operation mode (bridge) with respect to relay of the IPv6 packet and sets the first operation mode (router) with respect to relay of the IPv4 packet as the operation mode of the packet relay processor 30 (step S170).

When tunneling is unavailable (step S165: NO), on the other hand, the controller 20 sets the second operation mode (bridge) with respect to relay of the IPv6 packet and sets the second operation mode (bridge) with respect to relay of the IPv4 packet as the operation mode of the packet relay processor 30 (step S175).

As described above, the value of the M flag equal to "0" (step S155: NO) means that the WAN I/F 42 is connected with a router device and that the network relay device 10 is not allowed to distribute the address prefix. In this case, the network relay device 10 is accordingly not operable as the router device compatible with IPv6. When the address prefix is not obtained (step S120: NO), the network relay device 10 is not allowed to distribute the address prefix. In this case, the network relay device 10 is also not operable as the router device compatible with IPv6. In these cases, either the first connection mode shown in FIG. 3 or the second connection mode shown in FIG. 4 is assumed with respect to relay of the IPv6 packet. Irrespective of the availability or the unavailability of tunneling (at both steps S170 and S175), the controller 20 accordingly sets the second operation mode (bridge) with respect to relay of the IPv6 packet as the operation mode of the packet relay processor 30, so as to set the network relay device 10 as the bridge device. The case where the RA is not received (step S110: NO) and where the prefix is not obtained (step S120: NO) may be, for example, the case that a DHCP server is present but this DHCP server has already allocated all allocatable address prefixes and is not allowed to newly allocate any address prefix.

When tunneling is available (step S165: YES), the second connection mode is estimated out of the first connection mode and the second connection mode assumed based on the value of the M flag equal to "0". Accordingly the controller 20 sets the network relay device 10 as the router device with respect to relay of the IPv4 packet. When tunneling is unavailable (step S165: NO), on the other hand, the first connection mode is estimated, so that the controller 20 sets the network relay device 10 as the bridge device with respect to relay of the IPv4 packet.

A4. Advantageous Effects

The network relay device 10 of the first embodiment described above selectively sets either one of the first operation mode and the second operation mode with respect to each version of the IP (i.e., with respect to each of IPv4 and IPv6) as the operation mode of the packet relay processor 30. This enables both the IPv4 packet and the IPv6 packet to be normally relayed according to the connection mode using the network relay device 10 (network configuration). Additionally, the operation mode setting process estimates the connection mode and automatically sets the operation mode according to the estimated connection mode, so as to reduce the user's work load in identification of the connection mode and setting of the operation mode suitable for the identified connection mode.

The network relay device 10 also sends a Request message used in DHCP-PD from the WAN I/F 42. The network relay device 10 sets the first operation mode (router) with respect to relay of the IPv6 packet as the operation mode of the packet relay processor 30 in the case of successful acquisition of an address prefix by a Reply message responding to the Request message, while setting the second operation mode (bridge) with respect to relay of the IPv6 packet as the operation mode of the packet relay processor 30 in the case of failed acquisition of an address prefix. The operation mode of the packet relay processor 30 with respect to relay of the IPv6 packet can thus be adequately set according to the difference in connection mode whether the device operable as the gateway (router device) is present or not present on the WAN side of the network relay device 10.

In addition, the network relay device 10 outputs an RS from the WAN I/F 42 and sets the operation mode of the packet relay processor 30 with respect to relay of the IPv6 packet, based on reception or no reception of an RA as a reply to the RS. The network relay device 10 can thus more accurately identify the difference in connection mode whether the device operable as the gateway (router device) is present or not present on the WAN side of the network relay device 10 and adequately set the operation mode suitable for the connection mode.

Additionally, when receiving the RA, the network relay device 10 sets the operation mode of the packet relay processor 30 with respect to relay of the IPv6 packet according to the value of the M flag included in the RA. Even when the method of setting the IPv6 address using the M flag is specified, the network relay device 10 can adequately set the operation mode of the packet relay processor 30 with respect to relay of the IPv6 packet.

Furthermore, the network relay device 10 performs the tunneling availability checking process and sets the first operation mode (router) with respect to relay of the IPv4 packet as the operation mode of the packet relay processor 30 when tunneling is available, while setting the second operation mode (bridge) with respect to relay of the IPv4 packet as the operation mode of the packet relay processor 30 when tunneling is unavailable. Accordingly the network relay device 10 operates as the router device to perform tunneling when IPv4 communication is available using the IPv4 over IPv6 tunnel and thereby ensures high-speed relay (high-speed routing) of the IPv4 packet.

In addition, when an address prefix is obtained by a Reply message (step S120: YES) and when it is determined that tunneling is unavailable (step S130: NO), the network relay device 10 performs the communication setting process to identify the IPv4 address allocation system and sets the operation mode with respect to relay of the IPv4 packet according to the identified allocation system. The network relay device 10 can thus adequately set the operation mode according to the IPv4 address allocation system even when the IPv4 address allocation system is not identifiable in advance like the fourth connection mode.

Additionally, the communication setting process tries to obtain an IPv4 address from a DHCP server (step S300) and then tries to obtain an IPV4 address from a PPPoE server upon failure of acquisition of an IPv4 address from the DHCP server. Accordingly, whether the IPv4 address allocation system in the IPv4 network is the allocation system using the DHCP server or the allocation system using the PPPoE server, the communication setting process can obtain the IPv4 address. When the user name and the password in PPPoE have not been stored in advance in the network relay device 10, the communication setting process sends the Web page for entry of the user name and the password to the communication terminal device 430, so as to facilitate the operation for setting the user name and the password in the network relay device 10.

B. Second Embodiment

Figure 10:
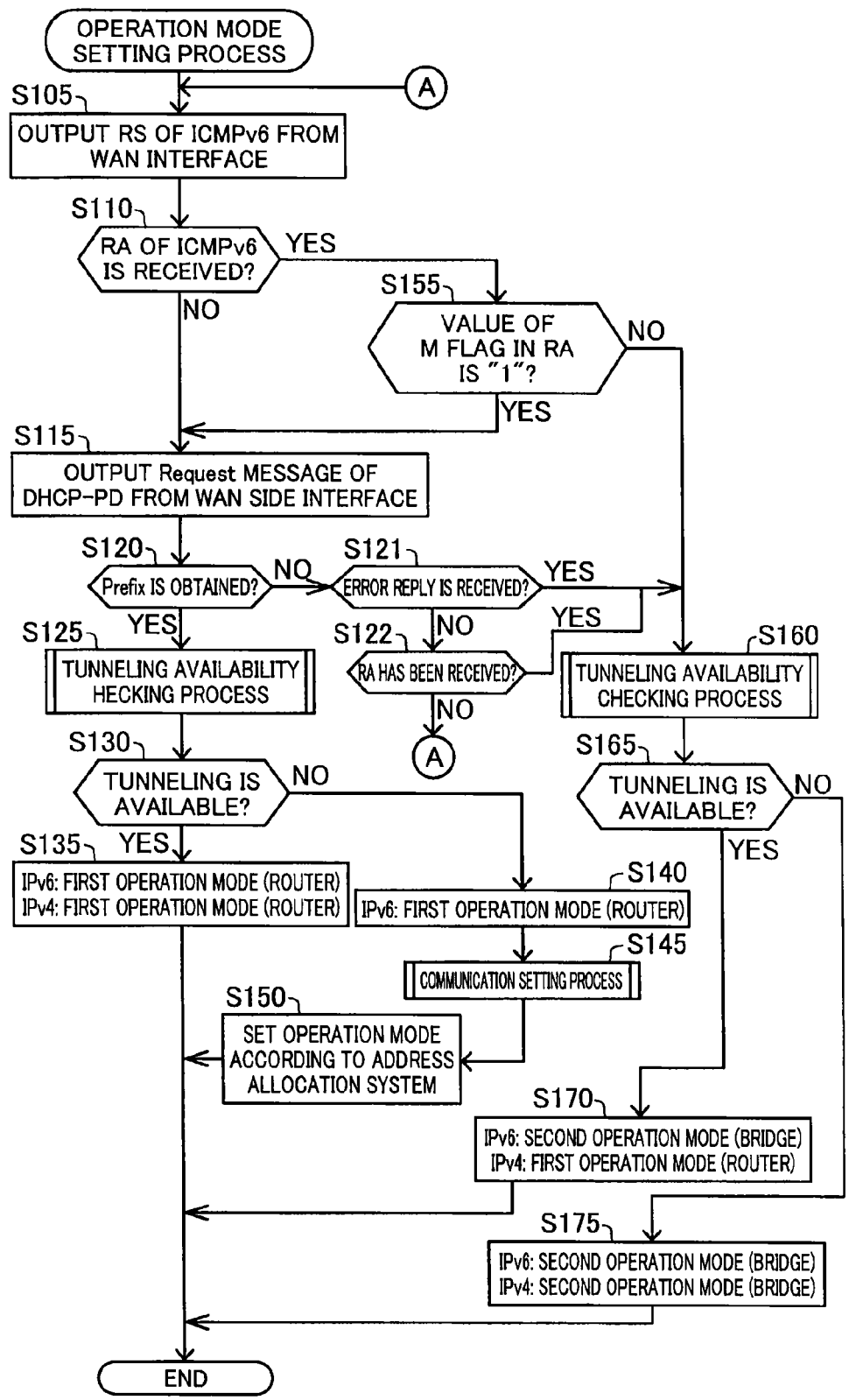
FIG. 10 is a flowchart showing a procedure of operation mode setting process according to a second embodiment.

FIG. 10 is a flowchart showing a procedure of operation mode setting process according to a second embodiment. A network relay device of the second embodiment has similar configuration to that of the network relay device 10 of the first embodiment, and the like components are shown by the like numerals and are not specifically described here in detail. An operation mode setting process of the second embodiment differs from the operation mode setting process of the first embodiment shown in FIG. 7 by addition of steps S121 and S122. Otherwise the procedure of the operation mode setting process of the second embodiment is similar to the procedure of the operation mode setting process of the first embodiment, and the like steps are shown by the like step numbers and are not specifically described here in detail. A tunneling availability checking process and a communication setting process performed in the second embodiment are identical with the corresponding processes performed in the first embodiment.

As shown in FIG. 10, when an address prefix is not received (step S120: NO), the controller 20 determines whether an error message (error reply) is received as a reply message to a Request message (step S121). When the error reply is not received (step S121: NO), the controller 20 determines whether an RA has already been received (step S122).

When the RA has not yet been received (step S122: NO), the process flow returns to step S105 described above. The case where the error reply is not received (i.e., no reply to the Request message is received) and where the RA has not yet been received suggests the state that communication in IPv6 is not at all available, so that the procedure of this embodiment returns the process flow to the first step and repeats the processing of steps S105 to S122 when communication in IPv6 becomes available.

When the RA has already been received (step S122: YES), on the other hand, the controller 20 performs the processing of step S160 described above (tunneling availability checking process). Similarly when the error reply is received (step 121: YES), the controller 20 performs the processing of step S160 described above. The case where the error reply is received as the response to the Request message or where the RA has already been received suggests the state that communication in at least IPv6 is available. In these cases, the controller 20 performs the processing of step S160 to check the availability or unavailability of tunneling.

The network relay device of the second embodiment described above has the similar advantageous effects to those of the network relay device 10 of the first embodiment.

C. Modifications

C1. Modification 1

The configuration of the network relay device 10 according to the above embodiment is only illustrative and may be modified in various ways. For example, the network relay device 10 and the communication terminal device 430 are directly connected with each other by a network cable in the above embodiment, but the disclosure is not limited to this configuration. The network relay device 10 and the communication terminal device 430 may be connected with each other, for example, via a layer 2 switch.

In another example, the LAN I/F 41 is provided as the function module that can serve as a wired LAN interface in the above embodiment but may be provided as a function module that can serve as a wireless LAN interface instead of the wired LAN interface. For example, IEEE 802.11a/b/g/n/ac may be employed for such a wireless LAN interface. In an application which employs the function module that can serve as the wireless LAN interface for the LAN I/F 41, the network relay device 10 serves as a wireless LAN access point in IEEE 802.11, and the communication terminal device 430 serves as a wireless LAN station in IEEE 802.11. In an application which uses a multi-function mobile phone (so-called smartphone) or a tablet computer as the communication terminal device 430, the function module that can serve as the wireless LAN interface may be employed for the LAN I/F 41. Like the modification of the LAN I/F 41 described above, a function module that can serve as a wireless LAN interface instead of the wired LAN interface may be employed for the WAN I/F 42. A function module that can serve as a wireless interface of making communication with a base station in a mobile communication network may also be employed for the WAN I/F 42. The mobile communication network may be any arbitrary network conforming to a wireless data communication standard such as 3rd Generation/High Speed Packet Access (3G/HSPA) or Long Term Evolution (LTE). This modified configuration does not need the optical network unit 410 in the third connection mode and allows the user to connect the communication terminal device 430 outside the user's home to the IPv6 Internet 100 or to the IPv4 Internet 200. In other words, the network relay device 10 is operable as a portable router device. The network relay device 10 of this configuration can appropriately operate as either the router device or the bridge device with respect to each version of the IP in the case of connection to the IPv6 Internet 100 or to the IPv4 Internet 200 via the mobile communication network.

Additionally, for example, in the third connection mode shown in FIG. 5, the optical network unit (ONU) 410 is configured as a separate body from the network relay device 10, but the disclosure is not limited to this configuration. A modified configuration that the optical network unit 410 is incorporated in the network relay device 10 may alternatively be employed.

C2. Modification 2

The packet relay processor 30 relays a packet on the third layer in the OSI reference model when operating in the first operation mode (router device) according to the above embodiment, but the disclosure is not limited to this configuration. For example, when the packet relay processor 30 operates in the first operation mode, a modified configuration may specify a relay path based on information defined on a fourth or upper layer in addition to the information defined on the third layer or in place of the information defined on the third layer and may relay an IP packet through the specified relay path. In one example, a concrete procedure may specify a relay path based on a port number which is information defined on the fourth layer (transport layer) in addition to a destination IP address and a source IP address which are information defined on the third layer and may relay an IP packet through the specified relay path. In general, a function module that specifies a relay path of an IP packet based on information defined on any layer of the third and upper layers in the OSI reference model and relays the IP packet through the specified relay path may be employed as a router function module in the network relay device of the disclosure.

C3. Modification 3

The operation mode setting process of the above embodiment outputs an RS from the network relay device 10 and determines the operation mode based on reception or no reception of an RA and the received set value of the M flag, but the disclosure is not limited to this configuration. A modified configuration may omit output of an RS and subsequent determination of the operation mode based on reception or no reception of an RA and the received set value of the M flag. More specifically, the processing of steps S105, S110 and S155 may be omitted. This modified configuration may first output a Request message (step S115) and subsequently determine the operation mode of the packet relay processor 30 with respect to relay of the IPv6 packet, based on reception or no reception of an address prefix included in a reply (Reply message) to this Request message. Omission of the processing of steps S105, S110 and S155 reduces the processing load of the communication setting processor 21 and shortens the time required for setting the operation mode. In this modified configuration, when the address prefix is not received, the first connection mode or the second connection mode is assumed. In the second connection mode, there is a need to form the IPv4 over IPv6 tunnel 700 between the network relay device 10 and the AFTR 510, and an IPv6 address is to be set in the network relay device 10 for this purpose. In this case, for example, an IPv6 address for forming the tunnel may be set in advance in the network relay device 10. In another example, the network relay device 10 may output an RS for the first time at this timing, receive allocation of an address prefix from the home gateway device 420 connected with the WAN I/F 42, and generate an IPv6 address (GUA: Global Unicast Address) by itself.

C4. Modification 4

The operation mode setting process of the above embodiment may be modified with omission of the tunneling availability checking process (steps S125 and S160) to set the operation mode with respect to only relay of the IPv6 packet but not set the operation mode with respect to relay of the IPv4 packet. In this modified configuration, the operation mode setting process may be triggered by power-on of the network relay device 10 and link-up of a port included in the WAN I/F 42 to set the operation mode with respect to only relay of the IPv6 packet. A tunneling availability checking process may subsequently be triggered by the network relay device 10 receiving an IPv4 packet output from the communication terminal device 430 (i.e., IPv4 packet having, as the destination, a device in a different network from a network which the communication terminal device 430 belongs to). The network relay device 10 may set the operation mode with respect to relay of the IPv4 packet based on the result of the tunneling availability checking process and relay a received IPv4 packet in the set operation mode.

C5. Modification 5

The operation mode setting process is triggered by power-on of the network relay device 10 and link-up of a port included in the WAN I/F 42 according to the above embodiment, but the disclosure is not limited to this configuration. For example, in the case that a network cable is not inserted into a port included in the WAN I/F 42 at the timing of power-on of the network relay device 10, the operation mode setting process may be triggered by insertion of the network cable into the port. In another example, in the case that a network cable is pulled out from a port included in the WAN I/F 42 during the power-on state of the network relay device 10, the operation mode setting process may be triggered by re-insertion of the network cable into the port. In yet another example, the operation mode setting process may be triggered by the LAN I/F 41 receiving an IPv6 packet or an IPv4 packet output from the communication terminal device 430.

C6. Modification 6

The above embodiment employs a communication path formed by the DS Lite-based tunneling technique for the IPv4 over IPv6 tunnel 700 or 710, but a communication path formed by any other technique that allows for capsulation of an IPv4 packet into an IPv6 packet, for example, Mapping of Address and Port with Encapsulation (MAP-E)-based tunneling technique may be employed instead of the DS Lite-based tunneling technique.

C7. Modification 7

The tunneling availability checking process of the above embodiment determines availability or unavailability of tunneling, based on reception or no reception of a reply (echo reply packet) to an echo request packet (so-called Ping) in ICMP, but the disclosure is not limited to this configuration. A modified configuration may send an echo request packet in ICMPv6 to an IPv6 address set in the AFTR 510 and send an echo request packet in ICMP (IPv4) (step S205) in the case of reception of a reply to the echo request packet in ICMPv6. This modified configuration may determine that tunneling is unavailable in the case of no reception of either a reply to the echo request packet in ICMPv6 or a reply to the echo request packet in ICMP (IPv4), and may determine that tunneling is available in the case of reception of both the replies to the above two echo request packets. This modified configuration may identify a reason why tunneling is unavailable to some extent. The IPv6 address of the AFTR 510 may be set in advance in the network relay device 10. The echo request packet in ICMP may be replaced with any packet having a Time To Live (TTL) set to "1".

In an application which employs a communication path formed by the MAP-E-based tunneling technique for the IPv4 over IPv6 tunnel 700 or 710, an authentication process may be performed with respect to a tunnel terminating device (BR) prior to transmission of the echo request packet in ICMP (IPv4) (step S205). This modified configuration may determine that tunneling is unavailable when the authentication is failed or when no reply is received to an echo request packet in ICMP (IPv4) subsequently sent, and may determine that tunneling is available when the authentication is successful and when a reply is received to the echo request packet in ICMP (IPv4).

C8. Modification 8

The above embodiment respectively sets the operation mode of the packet relay processor 30 with respect to the IPv4 packet and with respect to the IPv6 packet, but IPv4 and IPv6 are not essential. The operation mode of the packet relay processor 30 may be set with respect to each of any versions which the IP packet is compliant with.

C9. Modification 9

The communication setting process of the above embodiment first tries to obtain an IP address from the DHCP server and subsequently tries to obtain an IP address from the PPPoE server in the case of failure in obtaining the IP address from the DHCP server, but the disclosure is not limited to this configuration. For example, a modified configuration may first try to obtain an IP address from the PPPoE server and subsequently try to obtain an IP address from the DHCP server in the case of failure in obtaining the IP address from the PPPoE server. Another modified configuration may try to obtain an IP address from only one of the DHCP server and the PPPoE server.

C10. Modification 10

The configuration of the above embodiment unconditionally sets the second operation mode (bridge device) as the operation mode of the packet relay processor 30 with respect to relay of the IPv4 packet when an IP address is allocated from the DHCP server, while unconditionally setting the first operation mode (router device) when an IP address is allocated from the PPPoE server at step S150 shown in FIG. 7, but the disclosure is not limited to this configuration. For example, the following steps 1 to 3 may be performed to set the operation mode to the first operation mode (router device) or the second operation mode (bridge device) when an IP address is allocated from the DHCP server:

(step 1) The network relay device 10 outputs a DNS request and determines whether the network relay device 10 is connected to the IPv4 Internet 200;

(step 2) The network relay device 10 searches for an Universal Plug and Play Internet Gateway Device (UPnP IGD); and (step 3) The network relay device 10 sets the second operation mode (bridge device) when an UPnP IGD is found in a predetermined time period, while setting the first operation mode (router device) when no UPnP IGD is found in the predetermined time period.

The following steps 4 to 6 may be performed to set the operation mode to the first operation mode (router device) when an IP address is not allocated from the DHCP server:

(step 4) The network relay device 10 outputs a PPPoE discovery and searches for a PPPoE server;

(step 5) The network relay device 10 establishes a PPPoE session or prepares for establishing a PPPoE session when a PPPoE server is found. More specifically, when a user name and a password for authentication have already been set, the network relay device 10 outputs these pieces of information and establishes a PPPoE session. When the user name and the password for authentication have not yet been set, on the other hand, the network relay device 10 sends a Web page for entry of the user name and the password to the communication terminal device 430, like step S340 in the above embodiment; and (step 6) The network relay device 10 sets the operation mode to the first operation mode (router device) after obtaining an IP address from the PPPoE server through the PPPoE session.

C11. Modification 11

In the above embodiment, part of the configuration implemented by hardware may be replaced by software configuration, and on the contrary, part of the configuration implemented by software may be replaced by hardware configuration. When part or all of the functions of the disclosure are implemented by the software configuration, the software (computer program) may be provided in the form of storage in a computer readable storage medium. The "computer readable storage medium" herein is not limited to portable storage mediums such as flexible disk and CD-ROM but includes internal storage devices in the computer such as various RAMs and ROMs and external storage devices fixed to the computer such as hard disk drive. In other words, the "computer readable storage medium" has a broad meaning including any storage mediums that are not transitory but are able to fix data.

Figure 11:
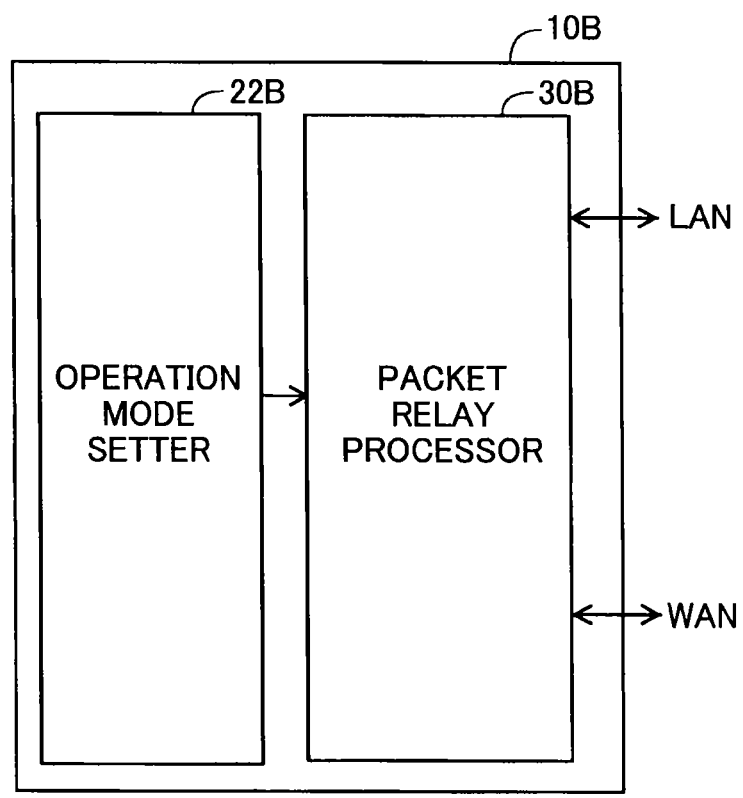
FIG. 11 is a diagram illustrating a network relay device according to another embodiment.

FIG. 11 is a diagram illustrating a network relay device 10B according to another embodiment. The network relay device 10B relays an IP packet compliant with an IP. The network relay device 10B includes a packet relay processor 30B and an operation mode setter 22B. The packet relay processor 30B processes an IP packet in each of a first operation mode of operating as a router device and a second operation mode of operating as a bridge device. The operation mode setter 22B selectively sets one of the first operation mode and the second operation mode with respect to each version of the IP that the IP packet to be processed by the packet relay processor 30B is compliant with, as the operation mode of the packet relay processor 30B. The configuration of another embodiment shown in FIG. 11 adequately sets the operation mode with respect to each version of the IP and thus ensures adequate relay of the IP packet of each version.

The disclosure is not limited to any of the embodiments, the examples and the modifications described herein but may be implemented by a diversity of other configurations without departing from the scope of the disclosure. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. For example, the disclosure may be implemented by any of the following aspects. Part of the configuration or the entire configuration of the disclosure may be implemented by hardware configuration. The hardware configuration may be, for example, an integrated circuit, a discrete circuit or a module by combining these circuits.

The disclosure may be implemented by any of the following aspects. According to one aspect, there is provided a network relay device that relays an IP packet compliant with the Internet Protocol (IP). The network relay device includes a packet relay processor that processes the IP packet in each of a first operation mode of operating as a router device and a second operation mode of operating as a bridge device, and an operation mode setter that selectively sets one of the first operation mode and the second operation mode with respect to each version of the IP that the IP packet to be processed by the packet relay processor is compliant with, as an operation mode of the packet relay processor. The network relay device of this aspect can selectively set one of the first operation mode and the second operation mode with respect to each version of the IP that an IP packet is compliant with, as the operation mode of the packet relay processor. The network relay device can accordingly set an adequate operation mode to the operation mode of the packet relay processor with respect to each version of the IP according to the connection mode using the network relay device (network configuration) and can thus normal relay the IP packet of any version.

In the network relay device of the above aspect, the operation mode setter selectively sets one of the first operation mode and the second operation mode with respect to each of versions of the IP including IP version 4 (IPv4) and IP version 6 (IPv6), as the operation mode of the packet relay processor. The network relay device of this aspect can set an adequate operation mode with respect to each of the IPv4 packet and the IPv6 packet according to the connection mode using the network relay device (network configuration).

In the network relay device of the above aspect, the network relay device further includes a request output module that outputs a Request message used in Dynamic Host Configuration Protocol-Prefix Delegation (DHCP-PD), to request for an address prefix compliant with IPv6, wherein the operation mode setter sets the first operation mode as the operation mode of the packet relay processor with respect to IPv6, when the address prefix is obtained by a Reply message responding to the Request message, and the operation mode setter sets the second operation mode as the operation mode of the packet relay processor with respect to IPv6, when the address prefix is not obtained by the Reply message. The network relay device of this aspect can adequately set the operation mode of the packet relay processor with respect to IPv6, according to the difference in connection mode whether a device operable as a gateway (for example, router device) is connected with the network relay device.

In the network relay device of the above aspect, further includes a WAN interface configured to be connectable with a Wide Area Network (WAN); and an RS output module that outputs an Router Solicitation (RS) message compliant with IPv6 via the WAN interface, wherein the request output module outputs the Request message, when an Router Advertisement (RA) message is not received as a reply to the RS message output by the RS output module. The network relay device of this aspect can more accurately identify the difference in connection mode whether a device operable as a gateway (for example, router device) is connected with the WAN interface of the network relay device and can thus set an adequate operation mode according to the connection mode.

In the network relay device of the above aspect, the request output module outputs the Request message when the RA message is received and when a value of an Managed Flag (M flag) included in the RA message is equal to 1. The network relay device of this aspect can adequately set the operation mode of the packet relay processor with respect to IPv6 in the state that the value of the M flag included in the RA message is set to 1 and that an IPv6 address is specified in a stateful manner.

In the network relay device of the above aspect, the network relay device further includes a tunneling processor that terminates an IPv4 over IPv6 tunnel and a communication tester that performs a communication test through the IPv4 over IPv6 tunnel with respect to another network relay device, wherein the another network relay device is different from the network relay device and terminates the IPv4 over IPv6 tunnel, and the operation mode setter sets the first operation mode as the operation mode of the packet relay processor with respect to IPv4, when the address prefix is obtained by the Reply message and when a result of the communication test shows that communication is available. The network relay device of this aspect sets the operation mode of the packet relay processor to the first operation mode when communication using the IPv4 over IPv6 tunnel is available and accordingly ensures high-speed relay (high-speed routing) of the IPv4 packet through the IPv4 over IPv6 tunnel.

In the network relay device of the above aspect, the operation mode setter sets one of the first operation mode and the second operation mode according to an IP address allocation system, as the operation mode of the packet relay processor with respect to IPv4, when the address prefix is obtained by the Reply message and when a result of the communication test shows that communication is unavailable. The network relay device of this aspect can adequately process an IPv4 packet even when the IPv4 over IPv6 tunnel is not available.

In the network relay device of the above aspect, the operation mode setter sets the second operation mode as the operation mode of the packet relay processor with respect to IPv6, when the RA message is received and when a value of an Managed Flag (M flag) included in the RA message is equal to 0. The network relay device of this aspect can adequately set the operation mode of the packet relay processor with respect to IPv6 in the state that the value of the M flag included in the RA message is set to 0 and that an IPv6 address is specified in a stateless manner.

In the network relay device of the above aspect, the network relay device further includes a tunneling processor that terminates an IPv4 over IPv6 tunnel and a communication tester that performs a communication test through the IPv4 over IPv6 tunnel with respect to another network relay device, wherein the another network relay device is different from the network relay device and terminates the IPv4 over IPv6 tunnel, and the operation mode setter sets the first operation mode as the operation mode of the packet relay processor with respect to IPv4, when the value of the M flag included in the RA message is equal to 0 and when a result of the communication test shows that communication is available, and the operation mode setter sets the second operation mode as the operation mode of the packet relay processor with respect to IPv4, when the value of the M flag included in the RA message is equal to 0 and when the result of the communication test shows that communication is unavailable. The network relay device of this aspect can relay an IPv4 packet to another network relay device which is different from this network relay device and is connected with this network relay device even when the IPv4 over IPv6 tunnel is not available.

What is claimed is:

1. An electronic device that relays an Internet Protocol (IP) packet compliant with one of a plurality of IP versions, comprising:
   a memory; and
   circuitry configured to:
      process the IP packet in each of a first mode operating as a router and a second mode operating as a bridge;
      set, as a mode of the electronic device, one of the first mode or the second mode, based on which of the plurality of IP versions the IP packet to be processed is compliant with, the plurality of IP versions including IP version 4 (IPv4) and IP version 6 (IPv6);
      output a Request message used in Dynamic Host Configuration Protocol - Prefix Delegation (DHCP-PD), to request for an address prefix compliant with IPv6;
      set the first mode as the mode with respect to IPv6, when the address prefix is obtained by a Reply message in response to the Request message; and
      set the second mode as the mode with respect to IPv6, when the address prefix is not obtained by the Reply message.

2. The electronic device according to claim 1, wherein the circuitry includes an interface configured to interface with a Wide Area Network (WAN); and
   the circuitry is configured to:
      output an Router Solicitation (RS) message compliant with Ipv6 via the interface; and
      output the Request message, when an Router Advertisement (RA) message is not received as a reply to the RS message output by the circuitry.

3. The electronic device according to claim 2, wherein the circuitry is configured to:
   output the Request message, when the RA message is received and when a value of an Managed Flag (M flag) included in the RA message is equal to 1.

4. The electronic device according to claim 3, wherein the circuitry is configured to:
   set the second mode as the mode with respect to IPv6 in at least one of:
   a first state in which the address prefix is not obtained by the Reply message and a message indicating an error is received as a reply to the Request message; and
   a second state in which the address prefix is not obtained by the Reply message and the RA message is received.

5. The electronic device according to claim 4, wherein the circuitry is configured to:
   terminate an Ipv4 over Ipv6 tunnel; and
   perform a communication test through the Ipv4 over Ipv6 tunnel with respect to another electronic device different from the electronic device, the another electronic device being configured to terminate the Ipv4 over Ipv6 tunnel, and
   set the first mode as the mode of the packet relay processor with respect to Ipv4, when the address prefix is obtained by the Reply message and when a result of the communication test shows that communication is available.

6. The electronic device according to claim 3, wherein the circuitry is configured to:
   terminate an Ipv4 over Ipv6 tunnel; and
   perform a communication test through the Ipv4 over Ipv6 tunnel with respect to another network electronic device different from the electronic device, the another electronic device being configured to terminate the Ipv4 over Ipv6 tunnel, and
   set the first mode as the mode of the packet relay processor with respect to Ipv4, when the address prefix is obtained by the Reply message and when a result of the communication test shows that communication is available.

7. The electronic device according to claim 2, wherein the circuitry is configured to:
   set the second mode as the mode with respect to Ipv6 in at least one of:
   a first state in which the address prefix is not obtained by the Reply message and a message indicating an error is received as a reply to the Request message; and
   a second state in which the address prefix is not obtained by the Reply message and the RA message is received.

8. The electronic device according to claim 7, wherein the circuitry is configured to:
   terminate an Ipv4 over Ipv6 tunnel; and
   perform a communication test through the Ipv4 over Ipv6 tunnel with respect to another electronic device different from the electronic device, the another electronic device being configured to terminate the Ipv4 over Ipv6 tunnel, and
   set the first mode as the mode of the packet relay processor with respect to Ipv4, when the address prefix is obtained by the Reply message and when a result of the communication test shows that communication is available.

9. The electronic device according to claim 2, wherein the circuitry is configured to:
   terminate an Ipv4 over Ipv6 tunnel; and
   perform a communication test through the Ipv4 over Ipv6 tunnel with respect to another electronic device different from the electronic device, the another electronic device being configured to terminate the Ipv4 over Ipv6 tunnel, and
   set the first mode as the mode of the packet relay processor with respect to Ipv4, when the address prefix is obtained by the Reply message and when a result of the communication test shows that communication is available.

10. The electronic device according to claim 2, wherein the circuitry is configured to:
    set the second mode as the mode with respect to Ipv6, when the RA message is received and when a value of an Managed Flag (M flag) included in the RA message is equal to 0.

11. The electronic device according to claim 10, wherein the circuitry is configured to:
    terminate an Ipv4 over Ipv6 tunnel;
    perform a communication test through the Ipv4 over Ipv6 tunnel with respect to another electronic device different from the electronic device, the another electronic device being configured to terminate the Ipv4 over Ipv6 tunnel;

set the first mode as the mode with respect to Ipv4, when the value of the M flag included in the RA message is equal to 0 and when a result of the communication test shows that communication is available; and set the second mode as the mode with respect to Ipv4, when the value of the M flag included in the RA message is equal to 0 and when the result of the communication test shows that communication is unavailable.

12. The electronic device according to claim 1, wherein the circuitry is configured to:

terminate an Ipv4 over Ipv6 tunnel;

perform a communication test through the Ipv4 over Ipv6 tunnel with respect to another electronic device different from the electronic device, the another electronic device being configured to terminate the Ipv4 over Ipv6 tunnel; and set the first mode as the mode with respect to Ipv4, when the address prefix is obtained by the Reply message and when a result of the communication test shows that communication is available.

13. The electronic device according to claim 12, wherein the circuitry is configured to:

set one of the first mode and the second mode according to an IP address allocation system, as the mode with respect to Ipv4, when the address prefix is obtained by the Reply message and when a result of the communication test shows that communication is unavailable.

14. The electronic device according to claim 13, wherein the circuitry is configured to:

set the second mode as the mode with respect to Ipv4, when the IP address allocation system of Ipv4 is an allocation system from Dynamic Host Configuration Protocol (DHCP) server.

15. The electronic device according to claim 13, wherein the circuitry is configured to:

set the first mode as the mode with respect to Ipv4, when the IP address allocation system of Ipv4 is an allocation system from PPP over Ethernet (PPPoE) server.

16. A network relay device that relays an Internet Protocol (IP) packet compliant with one of a plurality of IP versions, comprising:

a memory; and
circuitry configured to:
process the IP packet in each of a first mode operating as a router and a second mode operating as a bridge;
set, as a mode of the network relay device, one of the first mode or the second mode, based on which of the plurality of IP versions the IP packet to be processed is compliant with, the plurality of IP versions including IP version 4 (Ipv4) and IP version 6 (Ipv6);
output a Request message used in Dynamic Host Configuration Protocol - Prefix Delegation (DHCP-PD), to request for an address prefix compliant with Ipv6;
set the first mode as the mode with respect to Ipv6, when the address prefix is obtained by a Reply message in response to the Request message; and
set the second mode as the mode with respect to Ipv6, when the address prefix is not obtained by the Reply message.

17. A non-transitory computer readable storage medium having computer readable instructions stored therein, which when executed by an electronic device that relays an Internet Protocol (IP) packet compliant with one of a plurality of IP versions, cause the electronic device to:

set, as a mode of the electronic device, one of a first mode operating as a router or a second mode operating as a bridge device, based on which of the plurality of IP versions the IP packet to be processed is compliant with, the plurality of IP versions including IP version 4 (Ipv4) and IP version 6(Ipv6);
process the IP packet in one of the first mode and the second mode;
output a Request message used in Dynamic Host Configuration Protocol-Prefix Delegation (DHCP-PD), to request for an address prefix compliant with Ipv6;
set the first mode as the mode with respect to Ipv6, when the address prefix is obtained by a Reply message in response to the Request message; and
set the second mode as the mode with respect to Ipv6, when the address prefix is not obtained by the Reply message.

* * * * *